United States Patent [19]

Amatangelo

[11] 3,931,090

[45] Jan. 6, 1976

[54] RUBBER COMPOSITION FOR FLEXIBLE BELTS

[75] Inventor: Paul C. Amatangelo, Webster, N.Y.

[73] Assignee: Xerox Corporation, Stamford, Conn.

[22] Filed: Apr. 26, 1974

[21] Appl. No.: 464,392

[52] U.S. Cl. ...................... 260/23.7 M; 260/23.7 R
[51] Int. Cl.² .......................................... C08L 91/00
[58] Field of Search ... 260/23.7 M, 23.7 R, 45.95 R

[56] References Cited
UNITED STATES PATENTS

| | | | |
|---|---|---|---|
| 2,960,539 | 11/1960 | Rosenwald | 260/45.95 |
| 3,437,621 | 4/1969 | Aron | 260/23.7 M |
| 3,787,341 | 1/1974 | Aron | 260/23.7 M |

*Primary Examiner*—Donald E. Czaja
*Assistant Examiner*—H. H. Fletcher
*Attorney, Agent, or Firm*—James J. Ralabate; Donald C. Kolasch; Ernest F. Chapman

[57] ABSTRACT

A highly reversion resistant polyisoprene elastomer composition vulcanized with a low sulfur content is described and used in paper feed belts. The polyisoprene rubber compositions are particularly useful in the paper feed belts used to feed and transport paper in xerographic machines and paper sorting machines. The low-sulfur vulcanizate of isoprene provides high resistance to physical degradation due to dynamic mechanical stress under operating conditions.

17 Claims, No Drawings

RUBBER COMPOSITION FOR FLEXIBLE BELTS

BACKGROUND OF THE INVENTION

This invention relates generally to rubber compositions, and more particularly, to an isoprene rubber belt material for flexible paper feed belts in sheet feeders, transporters or separators in xerographic machines.

The development of high speed xerographic machines has brought about the need for reliable systems which are capable of feeding, transporting, separating and sorting paper and other materials in and through such machines at high speeds. One of the most reliable modes of feeding, transporting, separating and sorting paper and other materials throughout such machines is by means of flexible, endless belts. Examples of such belt means are found in U.S. Pat. No. 3,468,834 issued to Stange et al where a flexible separator feed belt formed from a material having a high coefficient of friction is connected between a separator drive pulley and a separator idler pulley. Sheet feeder belts which include endless loops of elastic material supported for movement about pulleys are also described by Stange in U.S. Pat. 3,768,803.

Prior to the introduction of high speed systems, standard rubber belts were sufficient for the manufacture of paper feed belts, paper transporting belts, paper separating belts and paper sorting belts where stress upon such belts was minimal, and there was little or no mechanical or physical degradation due to dynamic stress upon the rubber. Thus, belts for such systems could be manufactured from conventional rubbers, such as, natural rubber, neoprene rubber, polyacrylonitrile, butadiene/styrene rubbers and even stock isoprene rubber. However, when such conventional rubbers are used in the manufacture of flexible belts for use in high speed systems, mechanical degradation of the rubber occurs from the mechanical stress due to high speeds, and the useful life of such belts is shortened considerably requiring early replacement and loss of use of the system while the belt is being replaced. Furthermore, belts manufactured from conventional rubbers or elastomers are also characterized by reversion due to overcure and are easily degraded by oxidation at elevated operating temperatures.

OBJECTS OF THE INVENTION

Accordingly, it is the main object of this invention to provide a rubber composition for the manufacture of belts intended to feed, transport, separate or sort paper and other substrates.

It is a further object of this invention to provide a rubber composition for the manufacture of belts intended to feed, transport, separate or sort paper and other substrates at relatively high speeds.

It is another object of this invention to provide a rubber composition for paper feed belts and the like which will resist mechanical degradation due to physical stress when such belts are operated at high speeds.

Still another object of this invention is to provide a rubber composition for paper feed belts and the like which will resist overcure reversion or softening due to overcure.

SUMMARY OF THE INVENTION

These and other objects of the invention are attained by using a belt comprising isoprene rubber gum subjected to a low-sulfur cure. The low-sulfur vulcanizate is characterized by exceptionally high resistance to physical degradation caused by dynamic mechanical and thermal stress. Furthermore, the low-sulfur vulcanizate of the present invention is highly reversion resistant, that is, it can be subjected to relatively high temperatures during cure without reversion to lower or uncrosslinked states. By blending with an isoprene rubber gum, about 6.0 to about 15.0 parts by weight metallic oxide per 100 parts of isoprene; about 1.0 to about 5.0 parts by weight fatty acid per 100 parts of isoprene; 0.0 to about 2.0 parts by weight anti-oxidant per 100 parts of isoprene; and sulfur-containing accelerator and cure ingredients including about 0.5 to about 1.5 parts by weight of an organic polysulfide per 100 parts of isoprene, about 0.5 to about 1.5 parts by weight of a sulfenamide accelerator per 100 parts of isoprene, about 0.5 to about 1.5 parts by weight of a thiuram sulfide accelerator having at least two sulfide groups, per 100 parts of isoprene, and about 0.1 to about 1.3 parts by weight sulfur per 100 parts isoprene, an isoprene rubber vulcanizate for use in the manufacture of belts having high resistance to physical degradation at high speeds is produced. The critical inclusion of the specified cure ingredients results in a vulcanizate of isoprene gum having negligible thermal reversion at curing temperatures up to 375°F.

Although belts are described in accordance with the present invention which demonstrate excellent stability at high speed operating under dynamic stress conditions, such belts also have utility in systems where lower speeds are used and where mechanical and thermal stress are minimal or non-existent.

As used herein, paper feed belts refer to all manner of flexible, elastomeric belts used in xerographic systems or other paper handling systems where operating temperatures do not exceed about 150°F., and include belts used in xerographic systems or other paper handling systems and include belts for transporting, feeding, separating and sorting various weight papers and other similar materials including papers coated and/or impregnated with other materials such as plastics and/or photosensitive materials and the like.

DESCRIPTION OF THE PREFERRED EMBODIMENTS

A preferred belt material for the manufacture of flexible paper feed belts is prepared by adding to every 100 parts (by weight) of isoprene rubber gum, about 6.0 to about 15.0 parts by weight zinc oxide; about 1.0 to about 5.0 parts by weight stearic acid; 0.0 to about 2.0 parts by weight anti-oxidant; and sulfur-containing curing agents including about 0.5 to about 1.5 parts by weight 4,4'-dithiodimorpholine; about 0.5 to about 1.5 parts by weight of a sulfenamide accelerator; about 0.5 to about 1.5 parts by weight of thiuram disulfide accelerator; and about 0.1 to about 1.3 parts by weight sulfur.

Conventional blending and milling techniques of rubber compounding may be used for incorporating the ingredients including fillers, accelerators and curing agents into the isoprene rubber gum. The ingredients, including fillers and curing agents may be pre-mixed and added to the gum, or they may be added separately or in any desired combination to the isoprene rubber gum. One skilled in the art can determine the most advantageous method of incorporating the ingredients into the isoprene gum and the length of time necessary to work the ingredients into the isoprene. The determination may be made visually or by a predetermined length of time which is dependent upon the size of the batch, the blending speed and other factors.

When dispersion of the ingredients in the isoprene is satisfactory, the ingredients preferably being uniformly dispersed throughout the isoprene, the compounded isoprene can be formed into belts. Curing is preferably carried out at about 300°F., to about 340°F. The time required and optimal temperature to affect curing of the vulcanizate can be determined by one skilled in the art. The belts of the present invention may be made in any suitable manner, for example, the vulcanizable composition may be compression molded and heated to effect curing. The cured isoprene rubber may then be cut into the desirable shape for a paper feed belt if the sahpe of the mold is not in conformance with the desired belt.

It is critical that the belt material for the manufacture of paper feed belts in accordance with the present invention be prepared from polyisoprene rubber. When low-sulfur rubbers are prepared from other rubbers, for example, butyl rubber, natural rubber, styrene-butadiene rubber, nitrile rubber, chloroprene rubber and the like and curing is affected, the vulcanizates or elastomers formed thereby do not have the mechanical stability to perform in high speed systems when they are converted into belt members, or reproducible results cannot be attained with the vulcanizates. The isoprene gum used in the present invention is a cis 1,4-polyisoprene which may have as high as 97 percent cis content. A series of cis 1,4-polyisoprene synthetic rubbers which have been found useful in the paper feed belt compositions of the present invention are supplied by Good Year Tire & Rubber Company under the trademark, "Natsyn". For example, "Natsyn" 2200 isoprene rubber and "Natsyn" 400 isoprene rubber have been found useful in the compositions of the present invention.

The composition of the present invention normally contains a metallic oxide. The metallic oxide may be oxides of calcium, magnesium, lead or zinc, but zinc oxide is the preferred metallic oxide. There must be from about 6.0 to about 15.0 parts by weight of the metallic oxide, said oxide preferably being in a finely divided form. It is believed that the metallic oxide is instrumental in forming a rubber-soluble salt or soap with another compounding ingredient, the fatty acid, and in turn reacts with the accelerator, enabling it to exert its full effect. A suitable metallic oxide may be chosen by one skilled in the art.

Since most organic accelerators require the presence of fatty acids for their most efficient functioning, the composition must contain fatty acids, and it has been found that about 1.0 to about 5.0 parts of fatty acid are necessary to prepare the compositions useful for paper feed belts in accordance with the present invention. Stearic acid is the preferred fatty acid for the composition of the present invention, however, oleic and lauric acids can be used in place of stearic acid.

Although the anti-oxidant is not critical in preparing the vulcanizate found useful in accordance with the present invention, it has been found preferable to incorporate up to 2.0 parts by weight anti-oxidant per 100 parts by weight of polyisoprene. They are generally incorporated to further improve the resistance to deterioration during aging. A rubber anti-oxidant containing 25 percent dipara-methoxydiphenylamine, 25 percent diphenyl-para-phenylene-diamine and 50 percent phenyl-beta-napthyl-amine sold under the trademark "Thermoflex A" by du Pont is especially effective in the present composition. Most classes of commercial anti-oxidants may be used in the belt compositions of this invention including the aldehyde-amine type, the substituted phenol type, the bisphenol type, the hydroquinone type, the diarylamine type and the like. Examples of bisphenol types include 2,2'-methylene bis (4-ethyl-6-tertiary-butyl phenol) and 2,2'-bis (4-methyl-6-tertiary-butyl phenol). One skilled in the art of rubber chemicals and rubber compounding can select a suitable anti-oxidant or combinations of anti-oxidants to prepare the compositions of the present invention.

In the vulcanization or curing of the isoprene rubber gum, elemental sulfur is required along with organic sulfur compounds. Vulcanization or curing is generally known as the process by which polymer molecules are joined together by crosslinking reactions into larger molecules with restricted movement. The curing agents or cure ingredients are those compounds which affect the vulcanization. Since the rate of reaction between rubber and sulfur is slow even at elevated temperatures, accelerators are desirable in speeding up the reaction. Generally these accelerators not only produce better acceleration to the cure, but also give improved properties to the finished product. It is the critical combination of the cure ingredients and organic, sulfur-containing compounds (organic sulfur compounds) which produce a polyisoprene rubber or elastomer having excellent properties for improved paper feed belts for use in xerographic machines.

In vulcanizing the polyisoprene found useful in the present invention for improved paper feed belts, elemental sulfur is kept at a low level and is used in quantities ranging from about 0.1 to about 1.3 parts by weight sulfur per 100 parts of isoprene. In order to obtain a suitable rubber or vulcanizate in accordance with the present invention, that is, a composition for manufacture of paper feed belts having a high coefficient of friction for any substrate material which the belts must transport, and a high resistance to physical degradation due to dynamic mechanical stress, in addition to guarding against overcure reversion, it is also necessary to incorporate the following organic sulfur-containing compounds as specified.

There must be about 0.5 to about 1.5 parts by weight of at least one organic polysulfide per 100 parts by weight of polyisoprene. In addition to supplying additional small quantities of sulfur for vulcanization, this small amount of organic polysulfide also appears to be useful as an accelerator. By use of the term "polysulfide" herein is meant a material having at least two reactive or functional sulfide groups or moieties per molecule.

Best of the organic polysulfides suitable mainly for supplying sulfur for vulcanization, are the dimorpholine polysulfides, such as 4,4'-dithiodimorpholine. Other organic polysulfides which supply sulfur for vulcanization, are the liquid aliphatic polysulfides, such as the liquid ethylene polysulfides, typical of which is manufactured by Thiokol Chemical Corporation under the tradename "VA–7". Most of the compounds of this character are polymeric products produced by interaction of an alkylene dichloride, such as ethylene dichloride and like olefin dichlorides, with sodium sulfide, ethylene polysulfide, diethyl pentasulfide, alkyl phenol polysulfides, and the like.

There must also be about 0.5 to about 1.5 parts by weight of a sulfenamide accelerator per 100 parts of isoprene. Examples of these sulfenamides are N-t-butyl-2-benzothiazole sulfenamide, N-cyclohexyl-2-benzothiazole sulfenamide, N, N-diisopropyle2-benzothiazole sulfenamide, N-oxidiethylene-2-benzothiazole sulfenamide, N-(2,6-dimethylmorpholine)-2-benzothiazole sulfenamide, and N-diethyl-2-benzothiazole sulfenamide.

Another of the sulfur-containing accelerator ingredients used in vulcanization of the isoprene in accordance with the present invention, is the thiuram sulfides of the type having at least two functional or reactive sulfide moieties or groups. These thiuram sulfides must be available in the composition prior to vulcanization in amounts ranging from about 0.5 to about 1.5 parts by weight per 100 parts of polyisoprene. Typical examples of the thiuram sulfides of the type having at least two sulfide groups are, tetramethylthiuram disulfide, tetraethylenethiuram disulfide, dipentamethylenethiuram tetrasulfide, mercaptobenzothiazyl disulfide, and dimethyldiphenylthiuram disulfide.

Of course, it is within the purview of one skilled in the art to use two or more of any of the above designated ingredients in preparing polyisoprene rubber compositions for use in paper feed belts in accordance with the present invention as long as the concentrations of any particular combination of ingredients are within the critical limitations set forth. One can also add various adjuvants which do not adversely effect the desired characteristics of the vulcanized rubber or which do not effect the curing. Up to 15 parts by weight of adjuvants or combinations of adjuvants can be added to the compositions for use in rubber feed belt compounds. Examples of such adjuvants include reinforcing fillers, such as carbon blacks; plasticizers; and the like.

The following are typical examples of isoprene rubber recipes which are useful in the manufacture of paper feed belts, and tests which were conducted on the isoprene rubber compositions to determine if the rubber had the desirable properties and characteristics. Unless otherwise designated, all quantities herein are expressed in parts by weight.

Apparatus for Testing Paper Feed Belts

The test fixture used for performance characterization of the paper feed belts of the present invention consisted of a modified paper feed subsystem assembly as shown in FIGS. 3 and 8 of U.S. Pat. No. 3,469,834, incorporated herein by reference, and described therein at Column 5, line 60 to Column 7, line 31, in which the retard roll (numeral 282 in FIGS. 3 and 8 of the referenced patent) was mounted directly to a compression load cell (Honeywell Statham UC-3 transducer with a UL 4-10 coupler; range 0-10 lbs). Located between the retard roll and load cell was a locking nut attachment such that the retard roll to belt interference (pressure) could be adjusted. Static roll to belt loads of between 1.2 to 1.4 lbs. were maintained as initial set-up conditions. The belt feeding pulse was electronically controlled by an adjustable switching unit. Pulse rates were maintained at approximately 6000 per hour.

Test Procedure for Paper Feed Belts

Feed belt candidates wer tested on the above mentioned fixture at nominal loads of 1.2 to 1.4 lbs. and a pulse rate of 6000 per hour. The variable parameter measured was the load variation between static and dynamic conditions as a function of time (pulse cycles). These variations were monitored using a millivolt strip chart recorder. Static condition is defined as the loading pressure associated with a stationary belt (no pulse), whereas dynamic condition is defined as the maximum load associated during one pulse cycle.

Testing of each belt candidate was carried out beyond the point at which the ratio of dynamic to static loads reached 0.96 (approximately 4 percent reduction from static conditions).

The belt compounds tested as described above are shown in Table 1 below where the life of the belt is designated in hours and represents time up to the point at which the ratio of dynamic to static loads reached 0.96. Unless otherwise specified, the rubber compounds in the examples below contain 2 parts fatty acid for every 100 parts of rubber and 10 parts metallic oxide (ZnO) for every 100 parts of rubber.

EXAMPLE I

Isoprene rubber, supplied by Good Year Tire & Rubber Company under the tradename "Natsyn" 2200, in a quantity of 100 parts, was cured with a high sulfur content of 3.0 parts total sulfur per 100 parts of isoprene. The curing agents consisted of mercaptobenzothiazole, diphenyl guanidine, and sulfur. A paper feed belt was made and tested in accordance with the methods described above. The life of the belt up to the point at which the ratio of dynamic to static loads reach 0.96, was 2.3 hours.

EXAMPLES II AND III

Isoprene rubbers cured by the conventional curing agents designated in Example I above and having a high sulfur content of at least 3.0 parts total sulfur as provided by the curing agents and accelerators, mercaptobenzothiazole, diphenyl guanidine, and sulfur. The life in hours of the paper feed belts tested as described above were 0.85 and 0.4 in these respective tests.

EXAMPLE IV

The conventional curing agents and process described for Examples I-III above were utilized with 100 parts of isoprene rubber in accordance with the present invention, and a high sulfur content greater than 3.0 parts per 100 parts of isoprene rubber was used. The life of the paper feed belt prepared and tested as described above was 2.4 hours.

EXAMPLE V

Isoprene rubber as in the above Examples, was cured in the presence of 0.0 sulfur. The resulting paper feed belt prepared and tested in accordance with the above-described methods, had a life of 1.0 hour.

EXAMPLE VI

One hundred parts of isoprene rubber having a low metallic oxide (ZnO) content, that is, 2.0 parts zinc oxide per 100 parts of isoprene rubber, was prepared. The elemental sulfur content was 0.3 parts per 100 parts of isoprene rubber. The paper feed belt prepared and tested in accordance with the above-described techniques, had a life of 3.0 hours.

EXAMPLE VII

The isoprene rubber of Example I (100 parts) was cured using a low sulfur content of 0.3 parts sulfur per 100 parts of isoprene rubber. Sulfenamide accelerator designated as Santocure NS supplied by Monsanto Company, along with 4,4′-dithiodimorpholine, supplied by Monsanto Company under the tradename "Sulfasan R", were each used as curing agents or accelerators in quantities of 1.0 part per 100 parts of isoprene rubber. The polysulfide, t-methyl thiuram disulfide was used as a curing agent for crosslinking in a quantity of 0.7 parts per 100 parts of isoprene rubber. The paper feed belt compound prepared and tested as described above had a life of 2.0 hours. The short life of this paper feed belt compound is attributed to the low amount of polysulfide present in the composition.

EXAMPLE VIII

An isoprene rubber composition was prepared in accordance with the composition set forth in Example VII above with the exception that the polysulfide content was 0.4 parts per 100 parts of isoprene rubber. The polysulfide was supplied by Monsanto Company under the tradename "Thiurad" and consists of tetramethylthiuram disulfide. The paper feed belt prepared therefrom had a life of 1.0 hour.

EXAMPLE IX

One hundred parts of an isoprene/styrene butadiene rubber having 80 parts isoprene and 20 parts SBR was cured using a low elemental sulfur content of 0.3 parts per 100 parts of isoprene in the presence of 1.0 part per 100 parts of isoprene each of Santocure NS, a sulfenamide; Sulfasan R, 4,4′-dithiodimorpholine; and 1.0 part Thiurad, tetramethylthiuram disulfide. The paper feed belt prepared and tested in accordance with the above-described method had a life of 3 hours.

EXAMPLE X

One hundred parts of an isoprene rubber, Natsyn 2200 was mixed with 10 parts of zinc oxide per 100 parts of isoprene rubber, 2.0 parts of stearic acid per 100 parts isoprene rubber, and 1.25 parts of an antioxidant of mixed aromatic amines supplied by du Pont under the tradename "Thermoflex A". Curing agents consisting of elemental sulfur and accelerators were added to this formulation and consisted of 1.0 part 4,4′-dithiodimorpholine supplied by Monsanto under the tradename "Sulfasan R" per 100 parts isoprene rubber, 1.0 part sulfenamide accelerator supplied by Monsanto Company under the tradename "Santocure NS" per 100 parts isoprene rubber, 1.0 part tetromethylthiuram disulfide supplied by Monsanto Company under the tradename "Thiurad" per 100 parts isoprene rubber and 0.3 parts sulfur per 100 parts isoprene rubber. The paper feed belt prepared and tested in accordance with the above described technique, had a life in excess of 12 hours. This Example prepared in accordance with the method and compositions of the present invention has a performance far superior to the isoprene rubber compositions described in Examples I–IX above.

EXAMPLE XI

A urethane elastomer cured by conventional techniques, was not functional in paper feed belt compounds due to rapid deterioration.

EXAMPLES XII AND XIII

Natural rubber cured by a peroxide curing technique was not functional in paper feed belt compounds due to rapid deterioration. In Example XIII, natural rubber cured with a low sulfur technique resulted in a paper feed belt compound having a life of 8.3 hours. However, the natural rubber compound is generally unsuitable for paper feed belts due to the fact that the results are not consistently reproducible. The molecular weight of the low sulfur cured natural rubber varies too much under rubber compounding conditions, and degradation during rubber compounding is a factor which contributes to the inconsistent reproducibility of the paper feed belts made from such natural rubber compounds.

Table I below summarizes the paper feed belt compositions prepared in accordance with the present invention and represented by Example X, and compares other similar paper feed belt compositions represented by Examples I–IX and XI–XIII, all of which proved unsatisfactory for paper feed belts.

TABLE I

| EXAMPLE | RUBBER | CURE | LIFE (HOURS) |
|---------|--------|------|--------------|
| I | Isoprene | MBT/DPG/S | 2.3 |
| II | Isoprene | Conventional | 0.85 |
| III | Isoprene | Conventional | 0.4 |
| IV | Isoprene | High Sulfur | 2.4 |
| V | Isoprene | No Sulfur | 1.0 |
| VI | Isoprene | Low Sulfur (low ZnO) | 3.0 |
| VII | Isoprene | Low Sulfur | 2.0 |
| VIII | Isoprene | Low Sulfur | 1.0 |
| IX | Isoprene/SBR | Low Sulfur | 3.0 |
| X | Isoprene | Low Sulfur | 12.0 |
| XI | Urethane | Conventional | Not functional |
| XII | Natural Rubber | Peroxide | Not functional |
| XIII | Natural Rubber* | Low Sulfur | 8.3 |

*Results not consistently reproducible

The objects of the present invention have been amply demonstrated by the Examples and data set forth above. Excellent rubber compositions for the manufacture of belts intended to feed, transport, separate or sort paper and other substrates at relatively high speeds have been described. Such paper feed belts resist mechanical degradation due to physical stress when such belts are operated at high speeds. Overcure reversion has been overcome by the compositions of the present invention.

The apparent mechanism of failure for all but the isoprene rubber species, appears to be associated with the ability of the rubber to absorb instantaneous shear strain. All load variation failures were observed to be associated with the occurrence of tacky (masticated) rubber on the inside of the belt and on the outside of the idler roll. Static loads were obtained because of initial belt tension between the drive roll and idler roll, and interference of the retard roll with the belt. Belt pulsing created an instantaneous tension increase which lead to increased force on the retard roll. As the surfaces between the belt and idler roll became more adhesive, the belt tended to follow the idler roll, and thereby was physically lifted off the retard roll, thereby causing a force drop. As the intensity of adhesion increased, there occurred a commensurate drop in pulse load.

While this invention has been disclosed with reference to the methods and compositions disclosed herein, it is not necessarily confined to the details as set forth, and this application is intended to cover such modifications or changes as may come within the scope of the following claims.

What is claimed is:

1. A composition for manufacture of belts used to feed or transport substrate material, said belts being characterized by resistance to overcure reversion, by a high coefficient of friction for said substrate material and by a high resistance to physical degradation due to dynamic mechanical stress, comprising, synthetic polyisoprene; about 6.0 to about 15.0 parts by weight metallic oxide per 100 parts of polyisoprene; about 1.0 to about 5.0 parts by weight fatty acid per 100 parts of polyisoprene; 0.0 to about 2.0 parts by weight antioxidant per 100 parts polyisoprene and sulfur-containing cure ingredients and accelerators comprising about 0.5 to about 1.5 parts by weight of at least one organic polysulfide chosen from the group consisting of the dimorpholine polysulfides and the liquid aliphatic polysulfides per 100 parts of polyisoprene, about 0.5 to about 1.5 parts by weight of at least one sulfenamide accelerator per 100 parts of polyisoprene, about 0.5 to about 1.0 part by weight of at least one thiuram sulfide of the type having at least two sulfide groups or mercaptobenzothiazyl disulfide, accelerator per 100 parts of polyisoprene, and about 0.1 to about 1.3 parts by weight sulfur per 100 parts of polyisoprene.

2. The composition of claim 1 wherein said fatty acid is stearic acid.

3. The composition of Claim 1 wherein said anti-oxidant is selected from the group consisting of 2,2'-bis(4-methyl-6-tertiary-butyl phenol; 2,2'-methylene bis (4-ethyl-6-tertiary-butyl phenol; hydroquinone; and a mixture of di-para-methoxydiphenylamine, diphenyl-paraphenylene diamine, and phenyl-beta-naphthyl-amine.

4. The composition of claim 1 wherein the sulfenamide accelerator is selected from the group consisting of N-cyclohexyl-2-benzothiazole sulfenamide and N-tertiary-butyl-2-benzothiazole sulfenamide.

5. The composition of claim 1 wherein the thiuram sulfide accelerator is selected form the group consisting of tetramethyl thiuram disulfide and mercaptobenzothiazyl disulfide.

6. The composition of claim 1 wherein the metallic oxide is zinc oxide.

7. The composition of claim 1 wherein the organic polysulfide is 4,4'-dithiodimorpholine.

8. A belt material for the manufacture of flexible paper feed belts in sheet feeders, transporters or separators in xerographic machines made by the process of:
   a. adding to synthetic isoprene rubber gum about 6.0 to about 15.0 parts by weight zinc oxide per 100 parts of said gum; about 1.0 to about 5.0 parts by weight fatty acid per 100 parts of said gum; 0.0 to about 2.0 parts by weight anti-oxidant per 100 parts of said gum; and sulfur-containing cure and accelerator ingredients consisting essentially of about 0.5 to about 1.5 parts by weight 4,4'-dithiodimorpholine per 100 parts of said gum; about 0.5 to about 1.5 parts by weight of a sulfenamide accelerator per 100 parts of said gum, about 0.5 to about 1.5 parts by weight of thiuram sulfide of the type having at least two sulfide groups or mercaptobenzothiazyl disulfide, accelerator per 100 parts of said gum; and 0.0 to about 1.3 parts by weight sulfur per 100 parts of said gum; and
   b. working the ingredients of (a) into said gum to form a blend of the ingredients and the isoprene rubber gum.

9. The belt material made by the process of claim 8 further comprising forming the uniformly dispersed blend into a shape suitable for flexible belts and curing said blend at elevated temperatures.

10. The belt material made by the process of claim 9 wherein the blend is cured by exposing said blend to heat at about 300°F., to about 340°F.

11. The belt material made by the process of claim 8 wherein the ingredients of step (b) are pre-mixed and added to said gum.

12. The belt material made by the process of claim 8 wherein the sulfur-containing cure and accelerator ingredients of step (b) are pre-mixed and added to said gum.

13. The belt material made by the process of claim 8 wherein the fatty acid is stearic acid.

14. The belt material made by the process of claim 8 wherein the anti-oxidant is selected from the group consisting of diarylamines, hydroquinones, aldehydeamines, substituted phenols, bis phenols and mixtures of aromatic amines.

15. The belt material made by the process of claim 8 wherein the sulfenamide accelerator is selected from the group consisting of N-cyclohexyl-2-benzothiazole sulfenamide and N-tertiary-butyl-2-benzothiazole sulfenamide.

16. The belt material made by the process of claim 8 wherein the thiuram sulfide accelerator is selected from the group consisting of tetramethyl thiuram disulfide and mercaptobenzothiazyl disulfide.

17. The belt material made by the process of claim 8 further comprising adding up to 15.0 parts by weight reinforcing fillers or plasticizer or both per 100 parts of said gum, said fillers or plasticizers comprising ingredients having no effect on the curing of the gum.

* * * * *